July 21, 1931.  A. B. CASPER  1,815,184

SHOCK ABSORBER

Filed Aug. 21, 1929

Inventor

Anthony B. Casper

By Popp & Powers

Attorneys

Patented July 21, 1931

1,815,184

UNITED STATES PATENT OFFICE

ANTHONY B. CASPER, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed August 21, 1929. Serial No. 387,387.

This invention relates to a hydraulic shock absorber of the Houdaille type shown in U. S. Letters Patent No. 1,627,810 May 10, 1927, and has for its object the provision of improved means for by-passing some of the resistance liquid from one side of a piston to the other and to automatically relieve excess pressure of the resistance liquid under abnormal conditions such for example when the resistance liquid becomes stiff or slow flowing in cold weather.

With this end in view this invention consists generally in providing the hub of the pistons with a disk valve seat which can be made and assembled more economically than those heretofore in use for forming the by-pass of the absorber and also providing a flexible disk valve which cooperates with said valve seat and is adapted under abnormal pressures to be deflected at its outer edge and thereby automatically increase the port area of the relief or by-pass valve device in order to avoid excessive resistance of the liquid and insure easy riding of the car under different temperature conditions.

In the accompanying drawings:—

In the following description similar characters of reference indicate like parts in the several figures of the drawings.

Figure 1:
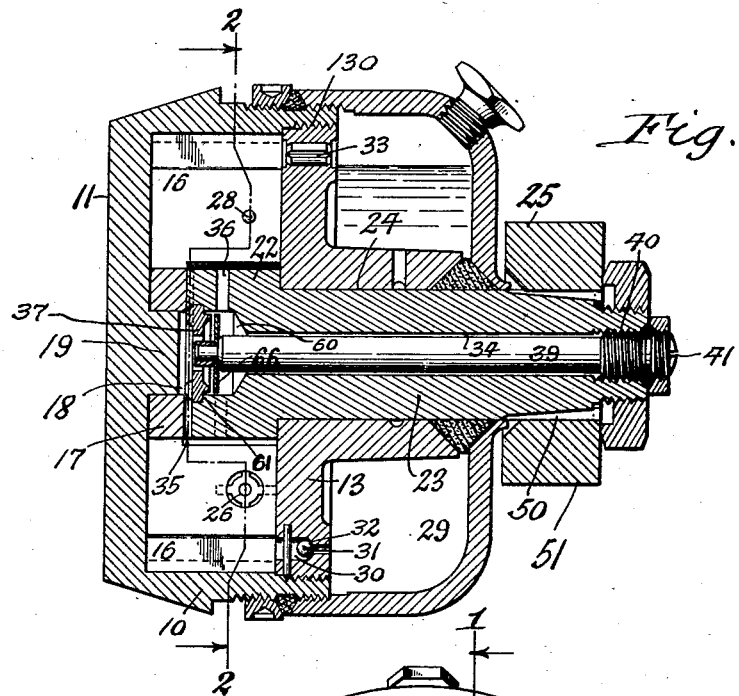
Figure 1 is a longitudinal section of a shock absorber embodying my improvements, taken on line 1—1 Fig. 2.

This shock absorber is provided with a hollow cylindrical body consisting preferably of a cylindrical peripheral wall 10, a rear head 11 formed integrally with the peripheral wall at the rear end thereof and provided with lugs 12 adapted to be connected with one of two relatively movable parts such as the frame of an automobile, and a front wall 13 connected at its edge with the front end of the peripheral wall by a screw joint 130.

The interior of this cylindrical body is divided into two segmental working chambers 14, 15 by a sectional partition having its sections 16, 16 arranged diametrically within the outer part of the body and their inner ends connected by a circular collar 17. The latter is provided centrally with an axial opening 18 the rear part of which receives a centering or pilot pin 19 projecting forwardly from the rear wall of the body while the front part of this opening is vacant to form part of a liquid by-pass between the working chambers as will presently appear.

Two working pistons or wings 20, 21 oscillate within these working chambers, the inner ends of these pistons being connected by a circular hub 22 which engages its periphery with the inner edges of the partition sections while its front end engages with the inner or rear side of the rear body wall 13, as shown in Fig. 1. The hub 22 is formed on the rear or inner end of a rock shaft 23 which is journaled in a bearing 24 on the central part of the wall 13 and has its external front end connected with a rock arm 25 which is connected with the other relatively movable part, such for example as the axle of an automobile upon which the frame of the car is mounted by means of a spring system. This arm is compelled to turn with the shaft by a key 50 and held against forward movement thereon by a clamping screw nut 51, as shown in Fig. 1.

The working chambers of the body are filled with a resistance liquid, such as oil, and during the low pressure strokes of the pistons this liquid is permitted to pass with comparative freedom from the low pressure end of each working chamber to the high pressure end of the companion chamber by a check valve controlled passage consisting preferably of a port 26 arranged in each partition section and provided with a valve seat 27 facing the high pressure end of the respective chamber, and a ball check valve 28 movable toward and from this valve seat.

In front of the body is arranged a replenishing chamber or reservoir 29 which is adapted to contain a reserve supply of resistance liquid and from the lower end of which this liquid is delivered to the lower ends of the working chambers through one or more replenishing ports 30, in the lower part of the wall 13 and each controlled by a check valve 31 which is arranged in the respective port 30 and movable toward and from a valve seat 32 therein which faces the working chambers, as shown in Fig. 1. Air is permitted to escape from the upper ends of the working chambers into the upper end of the replenishing chamber by vents 33 arranged in the wall 13 at the upper ends of these chambers.

For the purpose of regulating the cushioning effect of the resistance liquid in the shock absorber in accordance with the load imposed on the same and other variable conditions, valve controlled by-pass means are provided which permit the resistance liquid to flow back and forth between the several ends of the working chambers independently of the check valves in the partition sections which bypass valve means is constructed as follows:—

The numeral 34 represents a longitudinal bore formed in the shaft and hub of the pistons and having its rear end enlarged to form a circular valve chamber 60 which is arranged opposite the pocket or recess formed by the front end of the opening 18 in the collar 17.

On its rear face the hub is provided with two radial grooves 35, 35 leading from the opening 18 to the periphery of the hub and into the respective working chambers adjacent to the high pressure sides of the pistons, these grooves being closed on their rear sides by the front end of the collar 17 engaging with the rear end of the hub.

At a distance from the rear end of the hub the same is provided with two radial passages 36, 36 leading from the valve chamber to the periphery of the hub and into the respective working chambers adjacent to the low pressure side of the pistons.

Between the rear and front passages 35, 36 of the hub is arranged a valve seat disk 37 which has a central port or orifice 38 and has the front side of its marginal part engaging a rearwardly facing rabbet shoulder 61 formed in the bore of the hub while the rear side of this marginal part of the same is engaged by an annular retaining flange 62 formed on the rear end of the hub and bent into engagement with the rear side of said valve seat disk. The marginal part of the rear side of this disk is provided with a thickened rim 63 and this has formed therein two notches 64 which are in line with the rear radial grooves or passages 35 so as to place the opening 18 in communication with the working chambers at points adjacent to the high pressure side of the pistons.

On its front side the valve seat disk is provided with an annular raised valve seat 65 around its port and within the valve chamber is arranged a valve closure disk 66 which is adjustable toward and from the valve seat 65 for varying the effective area of the port or orifice of this valve. Longitudinal movement of the valve closure disk may be effected in various ways but preferably by a valve stem 39 arranged lengthwise in the bore of the hub and shaft and carrying the closure disk at its rear end while its front end is connected by a screw joint 40 with the shaft. Upon turning the valve stem by a screw driver engaging a nick 41 in the front end of the shaft, the valve closure disk 66 will be moved lengthwise so that its margin is arranged nearer to or farther from the valve seat 65 and thereby provide a port area of the desired capacity.

As the pistons oscillate back and forth in the working chambers some of the resistance liquid is pushed back and forth through the conduits of the by-pass device whereby a dead resistance to the movement of the pistons during the high pressure strokes is avoided and the shock is absorbed more gradually.

For the purpose of enabling the by-pass device to automatically increase its port area when the pressure of the resistance liquid rises above the normal, due for example to the liquid becoming thicker, more viscous or sluggish, the valve closure disk is made of flexible material such as thin spring sheet metal, which disk is secured only at its center to the valve stem thereby enabling the marginal part of this disk to be flexed out of its normal position when subjected to undue pressure.

When therefore the resistance liquid is thickened unduly in cold weather and flows less freely, the valve closure disk is subjected to a greater pressure as the pistons effect their high pressure strokes and at this time the marginal part of the flexible closure disk yields to some extent whereby the effective port area or orifice of the liquid metering or controlling device is increased and the liquid is permitted to flow through the bypass conduits with greater freedom and thus avoid hard and unpleasant action of the shock absorber at this time. When the liquid again resumes normal consistency the valve closure disk again returns to its normal unflexed condition.

To permit the valve closure disk to operate readily in this manner the same is mounted centrally on the valve stem by providing the latter at its rear end with a reduced shank or neck portion 42 which passes through a central hole in the closure disk and securing a ferrule 43 on the rear part of this shank by upsetting or riveting the rear end of the latter, as shown at 44, thereby confining the closure disk between the ferrule and the shoulder 45 formed on the stem between its large front part and its small rear part.

Figure 3:
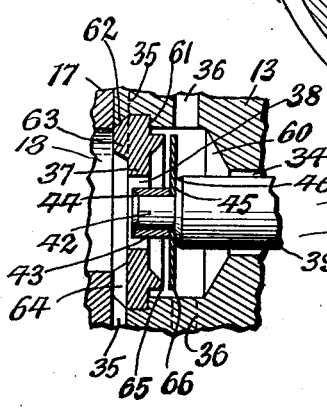
Figure 3 is a fragmentary longitudinal section, on an enlarged scale, of the by-pass or relief valve mechanism.

In order to permit the marginal part of the valve closure disk to be flexed over a maximum part of its area the outer part of the shoulder between the large and small part of the valve stem is bevelled, as shown at 46 in Figs. 1 and 3, thereby permitting the marginal part of this disk to bend forwardly or toward the right in Fig. 3 under the pressure of the resistance liquid to a greater extent than would be possible if this shoulder were square throughout its entire width.

This form of pressure regulating or metering device is simple in construction, the same is reliable and efficient in operation and not liable to get out of order, and the same automatically compensates for any changes in temperature so that the shock absorber operates uniformly under all weather conditions.

Figure 2:
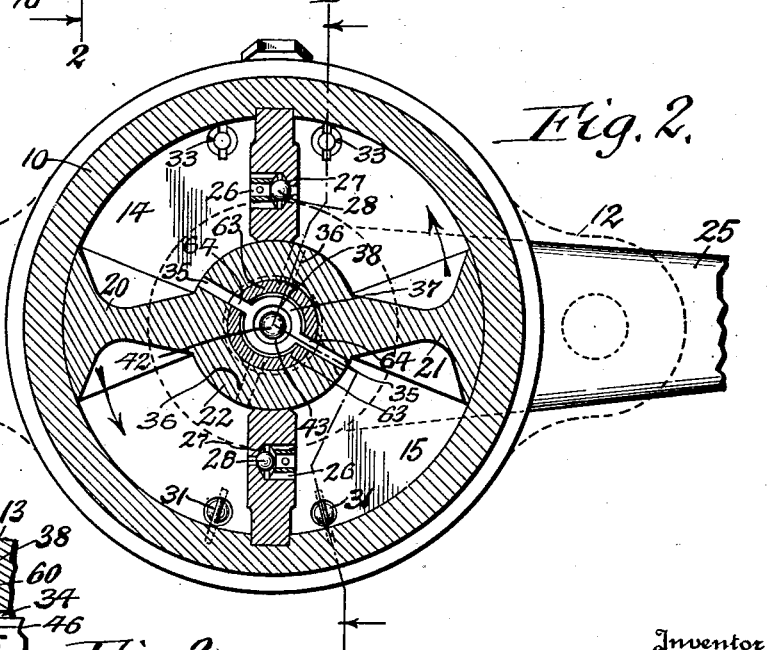
Figure 2 is a transverse section taken on line 2—2 Fig. 1.

It is to be understood in this connection that when the pistons are moving toward the low pressure ends of the working chambers, opposite to the arrows associated with the pistons in Fig. 2, some of the liquid passes from the low pressure ends of the working chambers past the check valves 28 which open at this time and directly into the high pressure ends of the working chambers and some liquid also passes indirectly from the low pressure ends of the working chambers successively through the passages 36, valve chamber 60, port 38, opening 18 and passages 35 to the high pressure sides of the piston, whereby a comparatively mild shock absorbing effect is produced. But when the pistons move in the direction indicated by the arrows associated therewith in Fig. 2 during a high pressure stroke the resistance liquid cannot pass through the ports 26 because the valves 28 are closed so that liquid at this time can only escape from the high pressure ends of the working chambers through the passages 35, opening 18, port 38, chamber 60 and passages 36 to the low pressure ends of the working chambers and thereby cause a more pronounced shock absorbing effect.

I claim as my invention:—

1. A shock absorber comprising a working chamber adapted to contain a resistance liquid, a piston movable back and forth in said chamber and having a hub containing a valve chamber and passages leading from said valve chamber to said working chamber, a disk valve seat mounted on the hub at one end of said valve chamber and provided with a port, and a flexible disk valve arranged in said valve chamber and movable toward and from said port and adapted to be flexed at its edge.

2. A shock absorber comprising a working chamber adapted to contain a resistance liquid, a piston movable back and forth in said chamber and having a hub containing a valve chamber and passages leading from said valve chamber to said working chamber, a disk valve seat mounted on the hub at one end of said valve chamber and provided with a port, and a disk valve arranged in said valve chamber and movable toward and from said port, and constructed of flexible material and adapted to have its marginal part deflected by abnormal pressure of the resistance liquid and automatically increase the port area of said valve device.

3. A shock absorber having a circular hollow body, partition sections arranged within said body and dividing the same into segmental working chambers which are adapted to contain a resistance liquid, a collar connecting the inner edges of said partition sections and having a central opening, pistons adapted to oscillate in said working chambers and connected with a hub having a central valve chamber and grooves in its end leading from said central opening in the collar to the periphery of said hub and into said working chambers on opposite sides of said partition sections, and also provided with radial passages arranged at a distance from said end grooves and leading from said valve chamber to the periphery of said hub and into said working chambers on opposite sides of said pistons, a valve seat disk mounted on the hub between said end grooves and radial passages and provided with a central port, and a valve for controlling said port.

4. A shock absorber having a circular hollow body, partition sections arranged within said body and dividing the same into segmental working chambers which are adapted to contain a resistance liquid, a collar connecting the inner edges of said partition sections and having a central opening, pistons adapted to oscillate in said working chambers and connected with a hub having a central valve chamber and grooves in its end leading from said central opening in the collar to the periphery of said hub and into said working chambers on opposite sides of said partition sections, and also provided with radial passages arranged at a distance from said end grooves and leading from said valve chamber to the periphery of said hub and into said working chambers on opposite sides of said pistons, a valve seat disk mounted on the hub between said end grooves and radial passages and provided with a central port, and a valve for controlling said port, said hub being provided with a rabbet shoulder which is engaged by one side of the marginal part of said valve seat disk and said hub having a retaining flange engaging with the opposite side of said marginal part of the valve seat disk.

5. A shock absorber having a circular hollow body, partition sections arranged within said body and dividing the same into segmental working chambers which are adapted to contain a resistance liquid, a collar connecting the inner edges of said partition sections and having a central opening, pistons adapted to oscillate in said working chambers and connected with a hub having a central valve chamber and grooves in its end leading from said central opening in the collar to the periphery of said hub and into said working chambers on opposite sides of said partition sections, and also provided with radial passages arranged at a distance from said end grooves and leading from said valve chamber to the periphery of said hub and into said working chambers on opposite sides of said pistons, a valve seat disk mounted on the hub between said end grooves and radial passages and provided with a central port, and a valve for controlling said port, said valve seat disk being provided on its rear side facing the collar with a marginal thickened rim which is provided with notches in line with said radial grooves.

6. A shock absorber comprising a hollow circular body, partition sections arranged within the body and dividing the same into segmental working chambers adapted to contain a resistance liquid, a collar connecting the inner edges of said partition sections and having a central opening, pistons adapted to oscillate in said working chambers, a hub connected with said pistons and provided with a central valve chamber and with rear passages leading radially from said collar opening to said working chamber and with front passages leading from said valve chamber to said working chambers, a valve seat disk mounted on the hub between said front and rear passages and provided with a central port, and a valve closure disk arranged in said valve chamber and movable toward and from said port.

7. A shock absorber comprising a hollow circular body, partition sections arranged within the body and dividing the same into segmental working chambers adapted to contain a resistance liquid, a collar connecting the inner edges of said partition sections and having a central opening, pistons adapted to oscillate in said working chambers, a hub connected with said pistons and provided with a central valve chamber and with rear passages leading radially from said collar opening to said working chamber and with front passages leading from said valve chamber to said working chambers, a valve seat disk mounted on the hub between said front and rear passages and provided with a central port, and a valve closure disk arranged in said valve chamber and movable toward and from said port, and constructed of flexible metal.

8. A shock absorber comprising a hollow circular body, partition sections arranged within the body and dividing the same into segmental working chambers adapted to contain a resistance liquid, a collar connecting the inner edges of said partition sections and having a central opening, pistons adapted to oscillate in said working chambers, a hub connected with said pistons and provided with a central valve chamber and with rear passages leading radially from said collar opening to said working chamber and with front passages leading from said valve chamber to said working chambers, a valve seat disk mounted on the hub between said front and rear passages and provided with a central port, and a valve closure disk arranged in said valve chamber and movable toward and from said port and constructed of flexible metal capable of being deflected at its peripheral edge.

9. A shock absorber comprising a hollow circular body, partition sections arranged within the body and dividing the same into segmental working chambers adapted to contain a resistance liquid, a collar connecting the inner edges of said partition sections and having a central opening, pistons adapted to oscillate in said working chambers, a hub connected with said pistons and provided with a central valve chamber and with rear passages leading radially from said collar opening to said working chamber and with front passages leading from said valve chamber to said working chambers, a valve seat disk mounted on the hub between said front and rear passages and provided with a central port, a valve closure disk arranged in said valve chamber and movable toward and from said port, a valve stem adjustable lengthwise in said hub and provided with a reduced rear end upon which said closure disk is mounted, and a bevelled shoulder on said stem engaging with the front side of said closure disk, and a ferrule secured to the reduced rear end of said stem and engaging with the rear side of said closure disk.

10. A shock absorber comprising a hollow circular body, partition sections arranged within the body and dividing the same into segmental working chambers adapted to contain a resistance liquid, a collar connecting the inner edges of said partition sections and having a central opening, pistons adapted to oscillate in said working chambers, a hub connected with said pistons and provided with a central valve chamber and with rear passages leading radially from said collar opening to said working chamber and with front passages leading from said valve chamber to said working chambers, a valve seat disk mounted on the hub between said front and rear passages and provided with a central port, a valve closure disk arranged in said valve chamber and movable toward and from said port, a hollow rock shaft journaled in a bearing on said body and connected with said hub, and a longitudinally adjustable valve stem arranged in said hub and shaft and having its inner end connected with said closure disk and having its outer end connected by a screw joint with said shaft.

In testimony whereof I hereby affix my signature.

ANTHONY B. CASPER.